United States Patent [19]

Skare

[11] 4,155,020
[45] May 15, 1979

[54] SNAP-FIT FASTENING SYSTEM FOR ATTACHING MEMBER TO AN ELECTRIC MOTOR

[75] Inventor: Thomas C. Skare, Bristol, Va.

[73] Assignee: Sundstrand Corporation, Rockford, Ill.

[21] Appl. No.: 843,292

[22] Filed: Oct. 18, 1977

[51] Int. Cl.² .............................................. H02K 5/00
[52] U.S. Cl. .................................... 310/91; 310/42; 85/1 P; 403/353
[58] Field of Search ............. 310/89, 91, 40 MM, 258, 310/51, 42; 403/353; 85/1 P

[56] References Cited

U.S. PATENT DOCUMENTS

| | | | |
|---|---|---|---|
| 1,296,275 | 3/1919 | Firth | 85/1 P |
| 2,176,118 | 10/1939 | Brinda | 310/258 |
| 2,537,621 | 1/1951 | Busom | 403/353 |
| 2,649,559 | 8/1953 | Wargo | 310/258 UX |
| 3,465,182 | 9/1969 | Church | 310/91 |
| 3,500,084 | 3/1970 | Ito | 310/89 |
| 4,076,196 | 2/1978 | Levine | 310/91 |

*Primary Examiner*—R. Skudy
*Attorney, Agent, or Firm*—Ted E. Killingsworth; William R. Peoples; Michael B. McMurry

[57] ABSTRACT

A snap-fit fastening system for use in attaching a member to an electric motor utilizes stator through-bolts with specially formed heads and the member includes a plurality of slots formed in a pattern similar to the pattern in which the through-bolt holes of the stator laminates are arranged, but with the slots extending radially relative to the central axis of the stator and being offset laterally relative to the associated holes. An annular flange integrally formed with each bolt intermediate its ends seats on the top laminate to confine deflection of the upper end of the bolt to movement in a generally radial direction. Bullet-shaped extensions integrally formed with the upper ends of the bolts telescoped into the slots so a lip formed in each extension snap-fits the member onto the bolts, the lips overlapping the edges of the slots to lock the member on the through-bolts.

3 Claims, 4 Drawing Figures

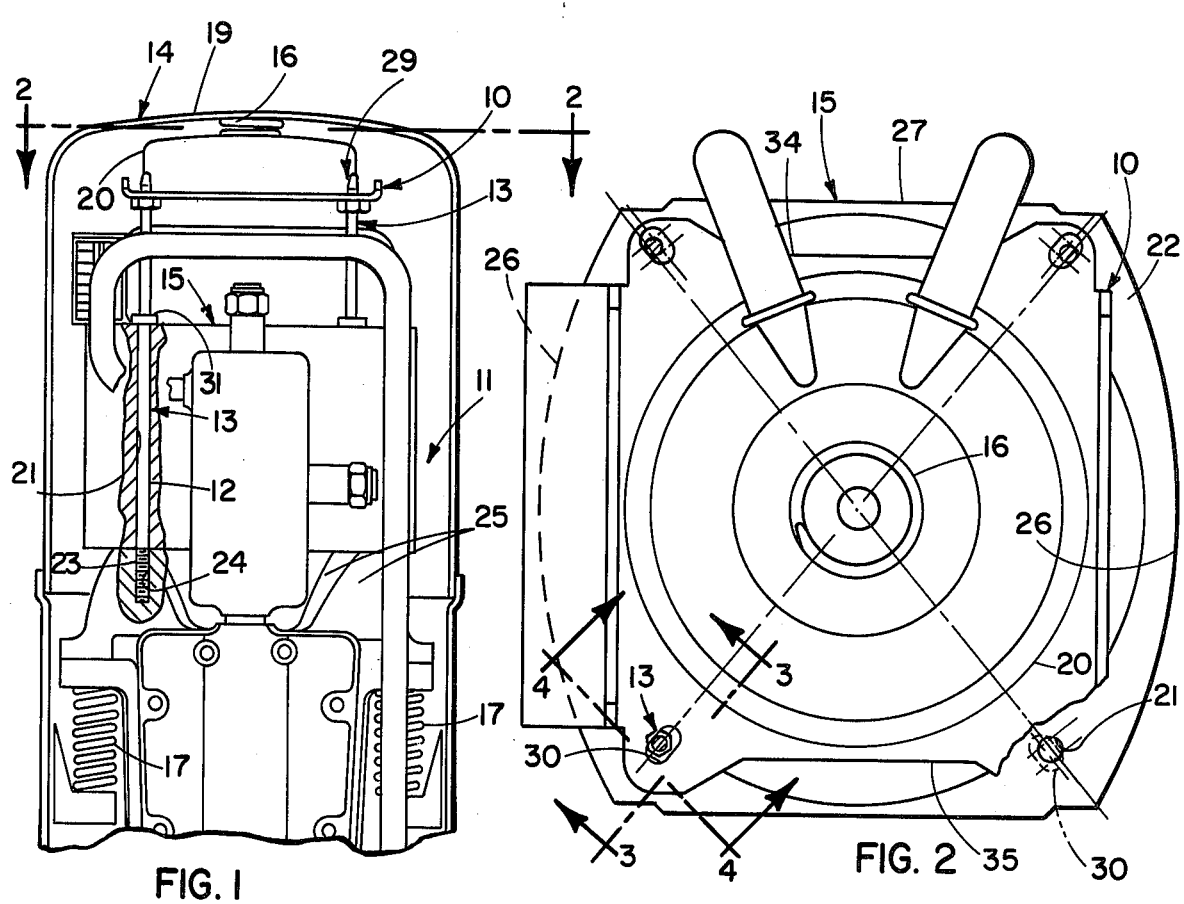
FIG. 1
FIG. 2
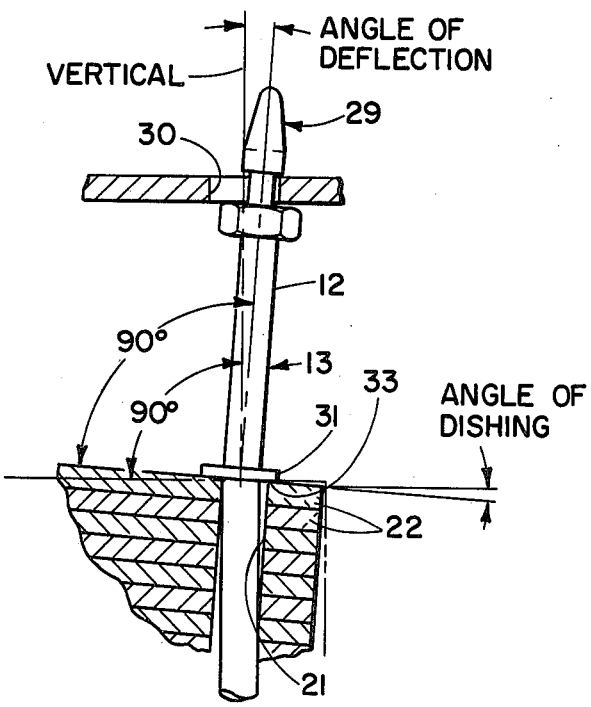
FIG. 3
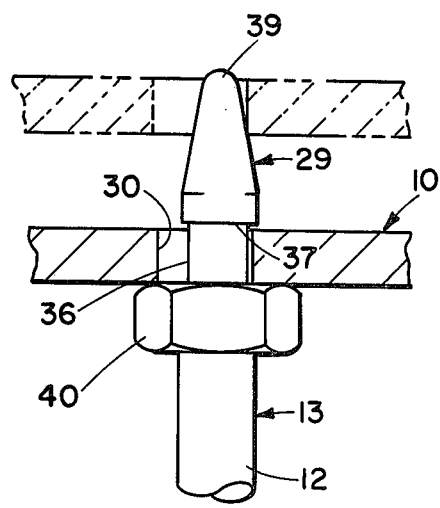
FIG. 4

SNAP-FIT FASTENING SYSTEM FOR ATTACHING MEMBER TO AN ELECTRIC MOTOR

BACKGROUND OF THE INVENTION

The present invention relates to a fastening system wherein the through-bolts of the stator of an electric motor may be used for securing a member to the motor. In one type of prior system, a muffler plate for a hermetic compressor is attached to the stator. Defining the stator are generally rectangular laminates or stamped plates which are stacked together. Each of the laminates includes a central opening for the motor rotor, and a hole at each corner for receiving a through-bolt. When stacked to form the stator, the laminates are held together by tightening the through-bolts in support members disposed beneath the lower laminate and the muffler plate is attached to the upper ends of the bolts.

Another arrangement for securing the stator laminates together while also providing means for attaching parts to an electric motor is disclosed in Church et al U.S. Pat. No. 3,465,182.

One of the difficulties encountered in utilizing the stator through-bolts for attaching a part to an electric motor is that, during the manufacturing process and in the assembly of the stator, the laminates may become bowed or dish-shaped so that, when inserted into the holes, the through-bolts on one side of the stator tend to spread apart while the opposite ends of the through-bolts tend to move closer together. As a result, standardization of a hole pattern in a member to be mounted on the ends of the through-bolts becomes difficult because the degree to which the stator is bowed may be different from one stator to the next.

One solution to this problem is disclosed in Fagley U.S. Pat. No. 2,479,330 wherein the bowing or bulging of the stator laminates is stated to be eliminated by utilizing spring washer spacers to separate certain laminations of the stator.

SUMMARY OF THE INVENTION

The primary object of the present invention is to provide a new and simplified fastening system for attaching parts to an electric motor in a particularly easy manner so as to reduce manufacturing and assembling costs. A more detailed object is to construct the fastening ends of the through-bolts in a unique fashion and to adapt the member to be fitted on the fastening ends of the through-bolts so that the bolts and the member snap-fit together with the bolts still serving to anchor the laminates of the stator together against the support member. A still further object is to achieve the foregoing regardless of any deviation in the relative positions of the fastening ends of the through-bolts such as might be caused by dishing of the stator laminates.

More particularly, the invention resides in the provision of an unique head on the fastening ends of each of the through-bolts to include a grooved extension particularly adapted to snap-fit within the member being attached to the motor.

The invention also resides in the provision of slots in the member to be attached to the motor with the slots advantageously oriented to receive the bolt head extensions with a snap-fit thereby avoiding the need for additional parts to secure the member to the motor with the through-bolts. In selecting the positions for the slots in the member, advantage is taken of the curvature in the dishing of the laminates to cause the fastening ends of the bolts to move in a generally radial direction relative to the rotor openings in the laminates. This is achieved by constructing each of the bolts to include a unique shoulder adapted to engage the top stator laminate so that during tightening, the fastening ends of the bolts move in only an essentially radial direction with respect to the rotor opening. Accordingly, the slots are oriented lengthwise in a generally radial direction to receive the bolt head extensions.

Still further, the invention resides in positioning the longitudinal axes of the slots so they are offset laterally from the pattern of the through-bolt holes defined in the laminates with at least one of the slots offset in a lateral direction opposite the direction in which the other slots are offset. By virture of this construction, when the bolt head extensions are telescoped into the slots, a natural bind results to lock the member to the through-bolts with a snap-fit.

These and other objects and advantages of the present invention will become more apparent from the following detailed description when taken in conjunction with the accompanying drawings.

BRIEF DESCRIPTION OF THE DRAWINGS

FIG. 1 is a fragmentary elevational view of the interior of a hermetic compressor utilizing a snap-fit fastening system embodying the novel features of the present invention to secure a muffler plate to an electric motor.

FIG. 2 is an enlarged plan view taken substantially along line 2—2 of FIG. 1.

FIGS. 3 and 4 are enlarged cross-sectional views taken substantially along lines 3—3 and 4—4 of FIG. 2, respectively.

DETAILED DESCRIPTION OF THE PREFERRED EMBODIMENT

As shown in the drawings for purposes of illustration, the present invention is embodied in a system for use in attaching a member 10 to an electric motor 11 through the use of stator through-bolts 13. Herein, the member is a muffler plate 10 of a hermetic compressor 14 and is supported above a stator 15 by four through-bolts 13. The muffler plate 10 in conjunction with the through-bolts serve as a part of a noise-reducing suspension system for the motor 11 of the compressor. To this end, the compressor motor 11 is supported on upper and lower springs 16 and 17, respectively. The upper spring 16 is sandwiched between the housing 19 of the compressor and a muffler cover 20 which is seated against the muffler plate 10 under urging of the spring 16.

To support the muffler plate 10 above the stator 15, the bolts 13 are telescoped through a predetermined pattern of holes 21 formed in the stator laminates 22 and threaded lower end sections 23 of bolts shafts 12 are received within threaded holes 24 of four motor supports 25. As shown in FIG. 2, the laminates 22 are generally rectangular in shape and include arcuate opposite sides 26 and generally straight sides 27. The through-bolt holes 21 are located at the four corners of each laminate 22 so as to define the aforementioned predetermined pattern.

In the manufacture of the electric motor 11, and when the through-bolts 13 are tightened to secure the laminates 22 together, the laminates tend to bow or become dish-shaped and, as a result, the upper ends of the bolts 13 tend to move relative to each other away from the pattern set by the holes 21. This can create some difficulty in mounting a member such as the muffler plate 10 on the upper ends of the through-bolts.

The present invention contemplates an unique system for snap-fastening a member such as the muffler plate 10 on the electric motor 11 in a quick and easy fashion regardless of relative movement of the upper ends of bolts 13 due to dishing of the laminates 22. For this purpose, each of the bolts 13 is uniquely formed to include upwardly projecting extensions 29 and slots 30 are formed in the plate 10 in a novel manner so that the extensions 29 snap-fit with the plate. Advantageously, to assure a snap-fit between the extensions and the plate, the slots are arranged in a pattern slightly offset from the pattern of the holes 21 in the laminates with each slot being offset laterally relative to the pattern of holes in the laminates a slight distance, with at least one of the slots being offset in a lateral direction opposite the direction in which the other slots are offset. Moreover, to avoid misalignment problems between the extensions and the slots, the slots are oriented to extend lengthwise in a generally radial direction relative to the central axis of the stator 15.

In the present instance, each of the four bolts 13 are structurally identical and function in essentially the same manner. Accordingly, hereinafter only the structure and function of one of the bolts will be described in detail, it being understood that such description also applies to the other bolts. Thus, as shown in FIG. 3, the bolt 13 includes an annular flange 31 which is formed integrally with the shaft 12 and is spaced upwardly from the threaded section 23. The downward face of the flange defines a lower surface or shoulder 33 engaging the upper face of the top laminate 22 so that, when the bolt is tightened in the threaded support opening 24, the laminates 22 will be pressed together by the flange 31. Because the laminates 22 may be dished, tightening of the bolt in the threaded opening 24 of the support 25 causes the flange 31 to seat flat against the curved surface of the upper laminate and cock upper end section of the bolt relative to vertical, deflecting it slightly so as to extend upwardly in a perpendicular direction relative to the upper face of the top laminate. The angle to which the bolt is deflected away from vertical is hereinafter referred to as the angle of deflection (see FIG. 3) and, depending upon the extent to which the laminates are dished, this angle may vary. In the manufacture of the stator 15, dishing is usually concentric with the central axis of the stator. As a result, by virtue of the annular flange 31, the angle of deflection is confined primarily within a vertical plane extending radially of the central axis of the stator. Accordingly, the relative movement of the upper ends of the four bolts is confined to generally radial movement in either an inward or outward direction, depending upon whether the laminates are dished upwardly or dished downwardly.

Preferably, in order for the muffler plate 10 to snap-fit on the upper end of the bolt 13 regardless of the radial direction or magnitude of the angle of deflection, the slots 30 are positioned to extend lengthwise in a generally radial direction relative to the central axis of the stator (see FIG. 2). By virtue of this construction, the plate may be oriented with all four slots in registry with the extensions 29 of the four bolts so that the plate may be assembled easily and quickly with the bolts regardless of the radial deflection caused by the dishing or bowing of the laminates.

To assure that the plate 10 snap-fits on the extensions 29 and the bolt 13 and is locked in place, the pattern of the slots 30 in the plate is arranged so that each of the slots is offset laterally from the position of its associated hole 21 formed in the laminates 22. In particular, as shown in FIG. 2, the two slots 30 on one side 34 of the plate 10 are offset towards each other from the pattern of the underlying holes 21. The two slots 30 on the opposite side 35 of the plate are similarly offset towards each other so that there is a binding fit between the bolts 13 and the sides of the slots 30. As seen in FIG. 2, the bolts 13 adjacent the side 34 of the plate are urged toward each other similarly, the two bolts adjacent the side 35 of the plate are urged toward each other.

To lock plate 10 on the bolts 13, the extension 29 of each bolt is formed with a suitable recess 36 in the form of an annular groove. The groove 36 thus defines a lip 37 (see FIG. 4) to overlap the edge of the slot 30 and thereby lock the plate in place. The extent to which the slots are offset from the pattern of the holes and the particular depth to which the grooves are formed in the extensions 29 preferably are chosen so as to insure that the lip 37 will always overlap the edge of the slot for all tolerance conditions between the bolts 13 and the plate 10.

As an aid in easing the assembly of the plate 10 with the four bolts 13, each of the extensions 29 is formed with a bullet-shaped end portion 39 the sides of which allow the plate 10 to be wedged onto the bolts by simply tapping on the plate. Once the plate is tapped over the lip 37, the lower face of the plate engages the top of a hex-shaped head 40 of the bolt and thus, it is supported in a vertical position spaced from the stator 15.

Thus, it is seen from the foregoing, that the present invention brings to the art a new and improved system for quickly and easily snap-fastening the member 10 on the electric motor 11 regardless of the extent of dishing of the stator laminates 22. To this end, the through-bolts 13 are provided with the flange 31 which serves to cause the bolts to cock in a generally radial direction relative to the central axis of the stator. In addition, the slots 30 are positioned to extend lengthwise within the member 10 in a generally radial direction so that the bolt extension 29 may easily fit within the slots regardless of the magnitude of the angle of deflection of each bolt relative vertical. Moreover, the slots are offset relative to the pattern of the holes 21 in the laminates so as to assure a snap-fit between the member and the extensions 29.

I claim:

1. A snap-fit fastening system for use in attaching a member to the stator laminates of an electric motor utilizing the stator through-bolts, each of said through-bolts comprising a threaded end section and an opposite end section with a head, said head including an extension projecting away from said threaded end section, and a laterally protruding lip formed on said extension and spaced from said head, shoulder means connected to said bolts in said opposite end sections and engaging said laminates to orient said bolts in a generally perpendicular direction relative to said laminates in a first pattern, said member including a plurality of slots formed therein to receive said head extensions, said slots being arranged in a second pattern offset from said first pattern to receive said bolt head extensions with said lips fitting over the edges of said slots with a snap-fit to lock said member to said stator laminates.

2. A snap-fit fastening system for use in attaching a member to an electric motor while also anchoring the laminates of the stator of the motor to a support, said system comprising a plurality of bolts for extending through holes in the laminates, said holes being arranged in a first pattern, each of said bolts including, a threaded lower end section for anchoring said laminates in threaded openings in said support, a shoulder integrally formed on said bolt intermediate the ends thereof to engage the top laminate for holding the laminates together when the bolt is threaded into the opening, and a head integrally formed with the opposite end of said bolt, said head including, upper and lower faces and an integrally formed extension protruding from the upper face thereof, said extension including a recess formed therein adjacent said upper face, and said member including a plurality of slots formed therethrough to receive said extensions of said bolts, said slots extending lengthwise in a generally radial direction relative to the central axis of said member and being arranged in a second pattern similar to said first pattern of said holes in said laminates with each of said slots being offset laterally relative to said first pattern with at least one of said slots being offset laterally in a direction opposite the lateral direction in which the others of said slots are offset for said member to be received with a snap-fit in the recesses of said extensions.

3. A snap-fit fastening system securing a member to dished stator laminates of an electric motor including, a motor support, a plurality of through-bolts telescoped through holes in the stator laminates, said holes being arranged in a first selected pattern in said laminates, each of said bolts including, a shaft with a threaded end section secured in said support, a head integrally formed with the opposite end section of said shaft, and an annular flange integrally formed with said shaft intermediate the ends thereof, said flange including a lower surface seating against the dished upper surface of the top laminate in said stator so as to cock said opposite end section in a generally radial direction with respect to the central axis of said stator, said head on each of said bolts including, a support surface engaging the underside of said member to support said member above stator, said member including, a plurality of slots formed therethrough and extending lengthwise in a generally radial direction relative to the central axis of said stator, said slots being arranged in a second selected pattern similar to said first selected pattern of said holes in said laminates with each of said slots being offset laterally relative to said holes in said first selected pattern with at least one of said slots being offset laterally in a direction opposite the lateral direction in which the others of said slots are offset, and a bullet-shaped extension protruding upwardly from each of said support surfaces, each of said extensions being telescoped through an associated one of said slots and including, a lip overlapping one edge of said associate slot to lock said member on said stator.

* * * * *